US005630900A

United States Patent [19]

Huang

[11] Patent Number: 5,630,900

[45] **Date of Patent: *May 20, 1997**

[54] METHOD FOR MANUFACTURING BLIND MATERIAL

[75] Inventor: Chung-Chen Huang, Taipei, Taiwan

[73] Assignee: Teh Yor Industrial Co., Ltd., Taipei, Taiwan

[ * ] Notice: The term of this patent shall not extend beyond the expiration date of Pat. No. 5,525,395.

[21] Appl. No.: 448,085

[22] Filed: May 23, 1995

[51] Int. Cl.$^6$ .............................. B32B 31/04; B32B 3/12

[52] U.S. Cl. .......................... 156/227; 156/197; 156/264; 156/292; 156/563; 160/84.05

[58] Field of Search .................................... 156/197, 264, 156/558, 559, 563, 227, 292; 160/84.01, 84.03, 84.05

[56] References Cited

U.S. PATENT DOCUMENTS

| | | | |
|---|---|---|---|
| 3,301,729 | 1/1967 | Kauffman | 156/197 |
| 3,477,893 | 11/1969 | Brazener et al. | 156/197 |
| 5,193,601 | 3/1993 | Corey et al. | 156/197 |
| 5,308,435 | 5/1994 | Ruggles et al. | 156/465 |
| 5,334,275 | 8/1994 | Romeo et al. | 156/563 |

*Primary Examiner*—Michele K. Yoder
*Attorney, Agent, or Firm*—Pro-Techtor International

[57] ABSTRACT

A method and apparatus for manufacturing blind material having an expandable dual cell honeycomb structure formed of a continuous length of foldable material. The material is fed onto the stack supporting means and transferred into the stack receiving means, and adhered successively by means of an appropriate pressure in the stack receiving means.

3 Claims, 3 Drawing Sheets

METHOD FOR MANUFACTURING BLIND MATERIAL

FIELD OF THE INVENTION

This invention relates to an improved method and an improved apparatus for manufacturing blind material.

BACKGROUND OF THE INVENTION

U.S. Pat. No. 4,849,039 discloses a method and apparatus for manufacturing blind material, in which a first layer of the material is applied to the stack supporting means and then a second layer is applied and adhered to the first layer. The stack supporting means 3 (as referred to FIGS. 7 and 8) has a pair of spaced parallel walls 12 which define a space to receive stack 7. At the bottom of each of the walls is a ridge 13 forming a constriction 14 therebetween. The constriction holds a portion of the stack 7 above the constriction and between walls 12. As the weight of the stack increases or under the influence of mechanical forces, the lowest layer is forced through the constriction.

In effect, the portion of the stack 7 above the constriction 14 is so suspended between walls 12 that to be slackened appreciately. In turn, the operation of making the second layer adhered onto the first layer would not be positive and some defects are usually occured.

SUMMARY OF THE INVENTION

It is, therefore, an primary object to provide a blind mat made of positively adhered stack.

The method comprises supplying a first layer of the material to the stack supporting means and transferring into the stack receiving means, then supplying a second layer to the stack supporting means and applying adhesive on the surface of the second layer, and transferring the second layer into the stack receiving means for adhering at the bottom of the preceding layer by means of an appropriate pressure. This procedure is repeated until desirable subsequent layers are stacked to form a blind mat product.

The apparatus employed for the method of the present invention comprises a stack supporting means for placing the blind material to be stacked, a material supplying means for feeding the blind material, with two gripping means for fixing the material, an adhering means for providing adhesive onto the surface of the material, a stack receiving means for receiving adhesive coated blind material being adhered successively by an appropriate pressure, and a cutting means to cut each layer of the material in a predetermined length.

The aforementioned and other objects, features and advantages will be better understood from the following description in detail with reference to the embodiments as illustrated in the accompanying drawings. Of course, the embodiments are given for illustrative purpose only and by no means to exert any limitation thereof.

DETAILED DESCRIPTION OF THE PREFERRED EMBODIMENTS

Figure 1:
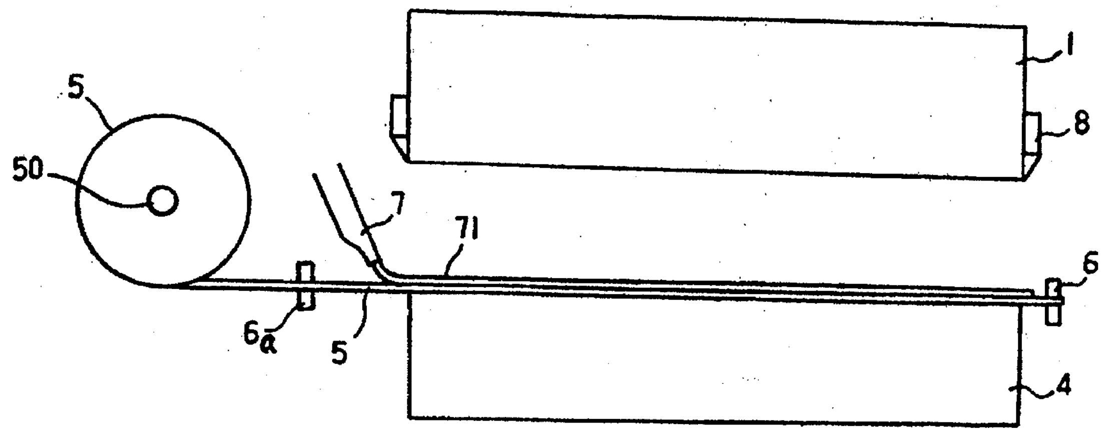
FIG. 1 is a schematic view of the apparatus of the invention at the end of placing a subsequent layer on the stack supporting means.
Figure 2:
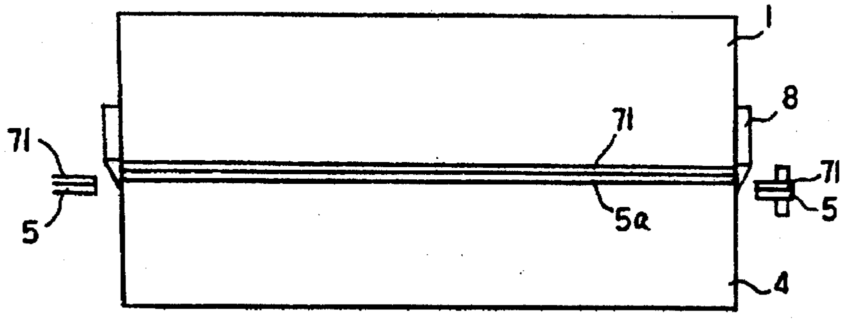
FIG. 2 is a similar schematic view illustrating the cutting of the layer.
Figure 3:
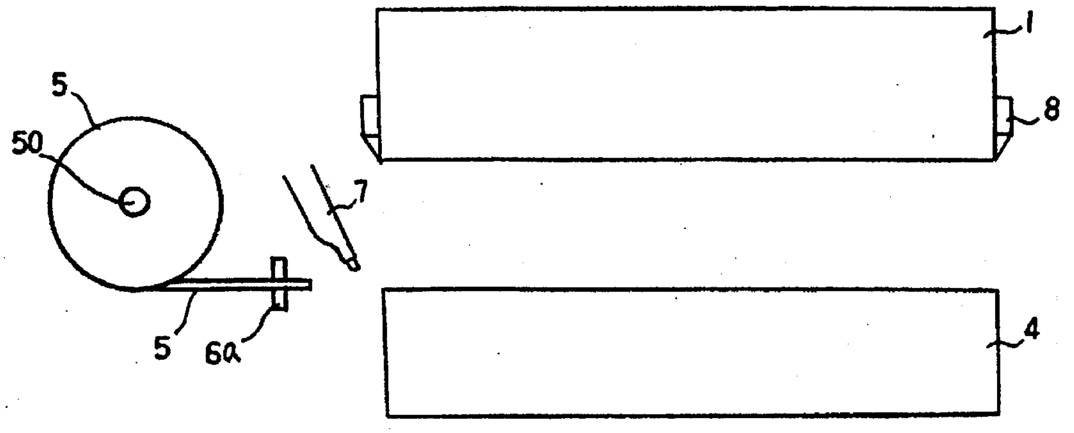
FIG. 3 is a schematic view illustrating the initiation of next layer.
Figure 4:
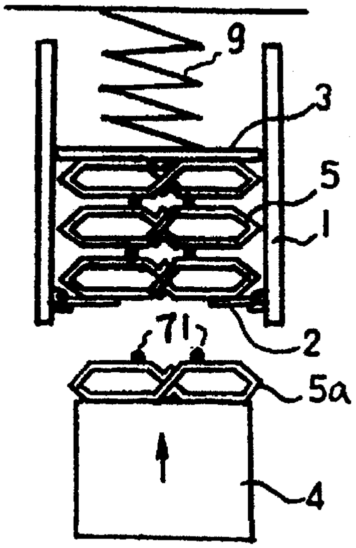
FIG. 4 is an end view corresponding to the state as illustrated in FIG. 1.

With reference to FIGS. 1 to 6 of the drawings, the apparatus employed in this invention comprises a stack receiving means 1 having a pair of spaced parallel walls which define an inner space to receive the stack of blind material, a pivotable holder 2 at the bottom of each of the walls and a top plate 3 exerting an appropriate pressure to the stack received therein by means of an expansion spring 9 and the like, and a stack supporting means 4 disposed below said stack receiving means 1. The stack supporting means 4 is caused in relative movement with respect to the stack receiving means 1 by up-and-down action. Alternatively, the stack supporting means 4 may be fixed while the stack receiving means 1 is moved up-and-down with respect to the stack supporting means 4.

In operation, the blind material 5 is fed from a supply roll fixed on a shaft 50 as referred to FIG. 1, and brought by one gripping means 6 and another gripping means 6a clamps the blind material 5 at incoming portion. This blind material has an expandable dual cell honeycomb structure formed of a continuous length of foldable material as disclosed in co-pending U.S. application Ser. No. 08/367 030 filed Dec. 28, 1994, which is incorporated herein for reference.

The dual cell honeycomb structure is formed by placing a first dual cell layer onto the stack supporting means. The dual cell layer is formed from a single length of foldable material, the material being folded so that a first polygonal cell and a second polygonal cell are formed from the single length of foldable material. The first and the second polygonal cells are aligned horizontally. The material includes a plurality of longitudinal folds forming the first polygonal cell, a first free end of the material is affixed to a first side of a latitudinal center point of the material so that the first cell is formed as a closed polygonal cell. A remaining half of the material is further folded to form the second polygonal cell. The remaining free end of the material is affixed to a second side of the latitudinal center point of the material so that the second polygonal cell is integral to the first polygonal cell, both cells being formed from the single length of material.

Figure 5:
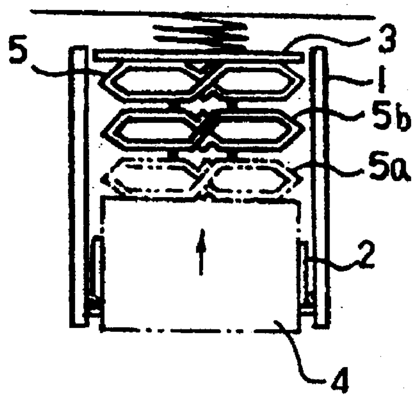
FIG. 5 is an end view illustrating the transfer of the subsequent layer into the stack receiving means.
Figure 6:
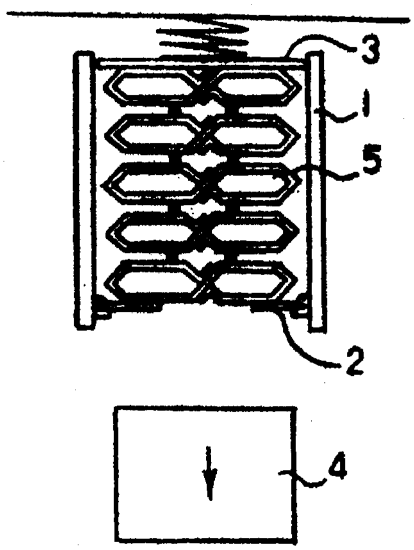
FIG. 6 is an end view illustrating the separation of the stack supporting means from the stack receiving means.
Figure 7:
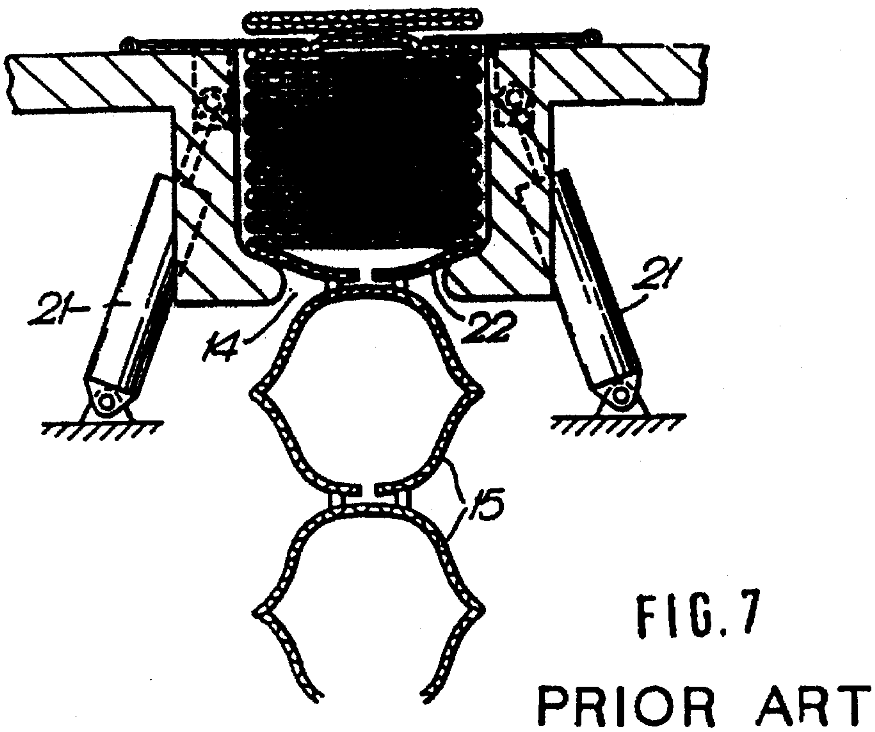
FIG. 7 PRIOR ART
FIGS. 7 and 8 disclose a prior art method of manufacturing blind material.
Figure 8:
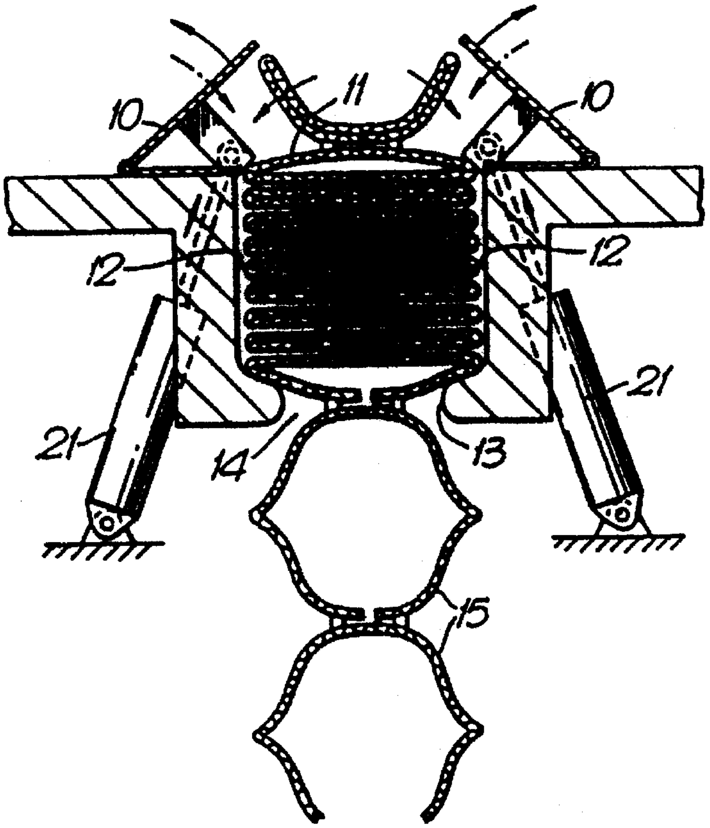
FIG. 8 PRIOR ART

Except the first layer, each subsequent layer of the blind material 5 is at sametime applied with adhesive through an applicator 7, for example in two straight lines 71, with one on each cell of honeycomb structure. When the blind material 5 placed on the stack supporting means 4 is transferred to the stack receiving means 1 by the relative movement therebetween, for example, as in the illustrated embodiment, the stack supporting means 4 is raised to the stack receiving means 1, both ends of the blind material 5 are cut by means of a cutting means 8, for example, affixed at opposite ends of the stack receiving means 1. The predetermined length Of the blind material 5*a* placed on the stack supporting means 4 is transferred into the stack receiving means 1, as best seen in FIG. 5. The pair of holders 2 is pivotably moved upright. The subsequent layer 5*a* of the blind material is contacted with the immediately preceding layer 5*b* and adhered at the bottom of the latter 5*b* by means of the adhesive 71 coated on the surface of the former 5*a* under a positive action in cooperation of the force exerted by the stack supporting means 4 and the counter force reacted by the top plate 3 through the expansion spring 9.

Then, the stack supporting means 4 is returned to the original state. Next, said another gripping means **6*a* brings the blind material 5 extended across the length of the stack supporting means 4, as above description of said one gripping means 6 with reference to FIG. 1, and said one gripping means 6 now is alternately returned to clamp the blind material at incoming portion instead of said another gripping means 6*a* as shown in FIG. 1**. The steps as mentioned above are repeated until predetermined number of subsequent layers are stacked to form the desirable blind mat.

While the invention has been described and illustrated in connection with preferred embodiments, many variations and modifications as will be evident to those skilled in this art may be made therein without departing from the spirit of the invention, and the invention should be only limited by the appended claims.

I claim:

1. A method for manufacturing an expandable honeycomb structure comprising the following steps:

A. placing a first dual cell layer onto a stack supporting means, said dual cell layer being formed from a single length of foldable material, said material being folded so that a first polygonal cell and a second polygonal cell are formed from said single length of foldable material, said first and said second polygonal cells being aligned horizontally, said material including a plurality of longitudinal folds forming said first polygonal cell, a first free end of said material being affixed to a first side of a latitudinal center point of said material so that said first cell is formed as a closed polygonal cell, a remaining half of said material including a further plurality of folds to form the second polygonal cell, a second free end of said material being affixed to a second side of said latitudinal center point of said material, side of said latitudinal center point of said material, said second polygonal cell being integral to said first polygonal cell, and being formed from said single length of material;

B. transferring said first dual cell layer to a stack receiving means, said first layer being cut to a predetermined length during said transfer operation;

C. placing a second dual cell layer onto said stack supporting means and applying an adhesive to a top side of said second dual cell layer;

D. transferring said second dual cell layer to said stack receiving means so that said second layer is adhered to said first layer, said second layer being cut to a predetermined length during said transfer operation;

E. repeating steps C–D for subsequent dual cell layers until a desired number of layers are adhered to each other to form a blind.

2. The method of claim 1 wherein:

a gripping means positions said dual cell layer on said stack supporting means, said dual cell layer being supplied from a supply roll of blind material.

3. The method of claim 1 wherein:

two lines of adhesive are applied to said top surface of said second and subsequent dual cell layers, one line on each cell of said dual cell layers.

* * * * *